H. A. WATERMAN.
CLUTCH MECHANISM.
APPLICATION FILED APR. 21, 1910.
995,828.
Patented June 20, 1911.
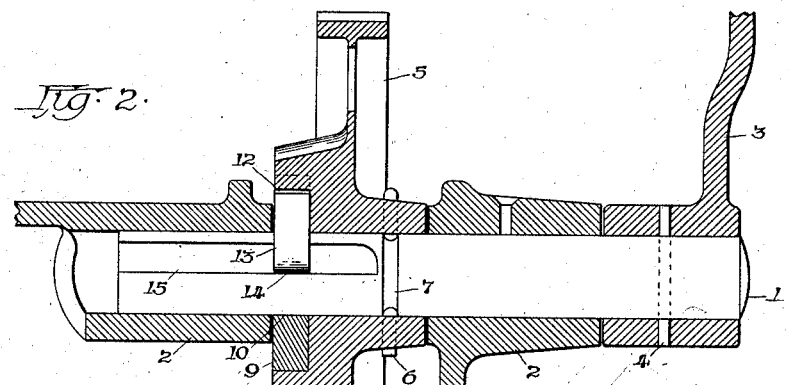
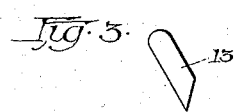
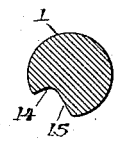
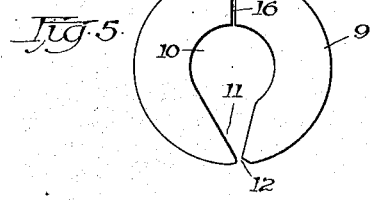
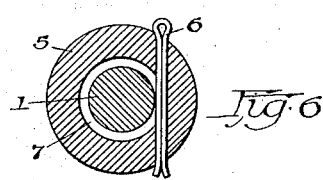
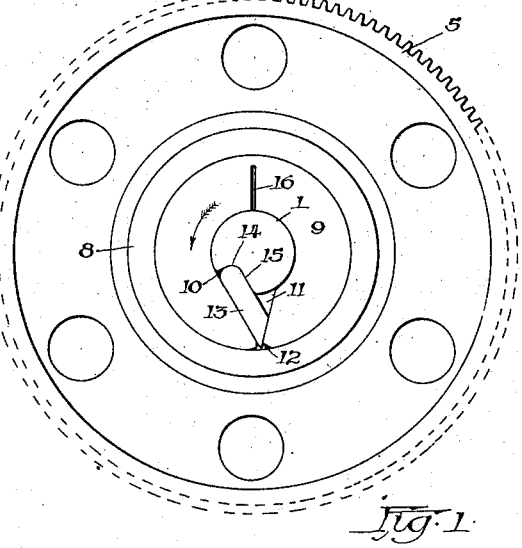
Witnesses:
F. W. Hoffmeister
H. J. Jarmer
Inventor
Henry A. Waterman
By E. W. Burgess
Attorney

UNITED STATES PATENT OFFICE.

HENRY A. WATERMAN, OF MILWAUKEE, WISCONSIN, ASSIGNOR TO INTERNATIONAL HARVESTER COMPANY, A CORPORATION OF NEW JERSEY.

CLUTCH MECHANISM.

995,828.

Specification of Letters Patent. Patented June 20, 1911.

Application filed April 21, 1910. Serial No. 556,710.

*To all whom it may concern:*

Be it known that I, HENRY A. WATERMAN, a citizen of the United States, residing at Milwaukee, in the county of Milwaukee and State of Wisconsin, have invented certain new and useful Improvements in Clutch Mechanism, of which the following is a specification.

My invention relates to clutch mechanism of the split ring type, and in particular to the construction of the split ring and the automatically operating means causing the ring to expand in a manner to operatively engage with the associated parts of the clutch mechanism or to allow it to contract and be disengaged therefrom, controlled by the variable speed ratio of the two parts; the object of my invention being to provide a clutch mechanism having few parts, simple and strong in construction, and efficient in operation. This object is attained by means of the mechanism illustrated in the accompanying drawings, in which—

Figure 1 represents a top plan view of the associated parts of the clutch mechanism; Fig. 2 is a longitudinal section of the clutch mechanism, as shown in Fig. 1; Fig. 3 is a detail of a ring expanding wedge; Fig. 4 represents a cross section of the shaft upon which the clutch members are mounted; Fig. 5 is a detail of the split ring; and Fig. 6 represents a cross section of the shaft and the hub of one of the clutch members, showing the manner of connecting the two parts.

The same reference numerals represent like parts throughout the several views.

Referring to the drawings 1 represents a driving shaft journaled in bearings 2 and having a crank 3 secured to one end thereof by means of a pin 4.

5 represents a gear wheel loosely mounted upon the shaft and prevented from moving longitudinally thereon by means of a pin 6 passing through the hub of the wheel at one side of the axis thereof and received by an annular groove 7 in the shaft, as shown in Fig. 6. 8 represents a bearing at the opposite end of the hub of the gear wheel and adapted to loosely receive the clutch ring 9, that is provided with an axial opening 10 to receive the shaft, and a gap 11 that extends from the opening therein to the periphery thereof, as shown in Fig. 5, the one wall of the gap being arranged tangentially relative to the axis of the shaft and the opposite wall thereof nearly tangential thereto and said walls converging toward the periphery of the ring are separated by a narrow intervening space 12.

13 represents a wedge member, preferably angular in cross section, with parallel sides and having its outer end cut at an angle and adapted to fit against the side of the gap in the direction of rotation of the gear wheel and shaft when operatively connected; the opposite side of said wedge member being adapted to contact with the opposite side of the gap. The inner end of the wedge member is made circular in a manner to be received by the curved shoulder portion 14 of a longitudinal groove 15 in the shaft, having its bottom portion arranged tangentially relative to the axis of the shaft and adapted to loosely receive the inner end of the wedge member.

16 represents a radially arranged cut in the ring 9 opposite to the gap, which cut nearly severs the ring into two parts, for the purpose of permitting easy expansion thereof.

In operation, the shaft being turned in the direction of the arrow, the wedge, with its inner end abutting the shoulder of the groove in the shaft, will be projected longitudinally into the gap in the split ring in a manner to cause expansion thereof and cause it to frictionally engage with the gear wheel, causing it to turn with the shaft, and if the ratio of rotative speed of the shaft and wheel be varied, the wedge will not be held in projected relation, but will permit the ring to contract and allow free rotation of the wheel relative to the shaft.

What I claim as being my invention, and desire to secure by Letters Patent, is:

1. A clutch mechanism including, in combination, a rotatable shaft, an annular clutch ring loosely mounted upon said shaft, a split clutch ring loosely mounted upon said shaft and adapted to be received by said annular ring in a manner to frictionally engage therewith, means for causing the frictional engagement of the two clutch members, including a longitudinal groove in said shaft, and a wedge engaging with a side of said groove and with said split ring in a manner to move longitudinally to cause expansion of the latter when said shaft is turned in one direction.

2. A clutch mechanism including, in combination, a rotatable shaft, an annular clutch ring loosely mounted upon said shaft, a split clutch ring having an axial opening that loosely receives said shaft, said split ring being received by said annular ring in a manner to frictionally engage therewith, said split ring having a gap extending from its axial opening to the periphery thereof, a wedge having one end projecting into said gap and adapted to move longitudinally in a manner to expand said ring, and a longitudinal groove in said shaft adapted to receive the opposite end of said wedge.

3. A clutch mechanism including, in combination, a rotatable shaft, an annular clutch ring loosely mounted upon said shaft, a split ring having an axial opening that loosely receives said shaft, said split ring being received by said annular ring in a manner to frictionally engage therewith, said split ring having a gap extending from its axial opening to the periphery thereof, said gap having one of its walls arranged tangentially with respect to the axis of said shaft and the opposite wall nearly tangential thereto, and said wall converging toward the periphery of the ring, a wedge disposed within said gap and having one end cut at an angle in a manner to engage with the side of the gap in the direction of rotation of said shaft, and a longitudinal groove in said shaft adapted to receive the opposite end of said wedge in a manner to cause it to be projected into said gap when said shaft is turned in one direction.

4. A clutch mechanism including, in combination, a rotatable shaft, an annular clutch ring loosely mounted upon said shaft, a split ring having an axial opening that loosely receives said shaft, said split ring being received by said annular ring in a manner to frictionally engage therewith, said split ring having a gap extending from its axial opening to the periphery thereof, and a slot cut in the opposite side of said ring extending from said axial opening to near the periphery thereof, one of the sides of said gap being arranged tangentially relative to the axis of said shaft and the other side thereof nearly tangential thereto, and said walls converging toward the periphery of said ring, a wedge disposed within the gap, having one side contacting with the side of the gap opposite to the direction of rotation of said shaft, and its outer end cut at an angle and contacting with the opposite side of said gap, and a longitudinal groove in said shaft adapted to receive the opposite end of said wedge in a manner to cause it to be projected into said gap when said shaft is turned in one direction.

HENRY A. WATERMAN.

Witnesses:
D. A. McIntyre.
F. C. Bradley.